US009068638B2

(12) United States Patent
Iwase et al.

(10) Patent No.: US 9,068,638 B2
(45) Date of Patent: Jun. 30, 2015

(54) VEHICLE DRIVE DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Mikio Iwase, Anjo (JP); Daiki Suyama, Okazaki (JP); Naoya Jinnai, Anjo (JP); Tatsuya Okishima, Ciryu (JP); Yukihiko Ideshio, Nissin (JP); Yuji Inoue, Nissin (JP)

(73) Assignees: AISIN AW CO., LTD., Anjo (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/240,310

(22) PCT Filed: Oct. 31, 2012

(86) PCT No.: PCT/JP2012/078189
§ 371 (c)(1),
(2) Date: Feb. 21, 2014

(87) PCT Pub. No.: WO2013/065748
PCT Pub. Date: May 10, 2013

(65) Prior Publication Data
US 2014/0230423 A1    Aug. 21, 2014

(30) Foreign Application Priority Data

Nov. 4, 2011    (JP) .................................. 2011-242701

(51) Int. Cl.
*F16H 47/06*    (2006.01)
*B60K 6/26*    (2007.10)
(Continued)

(52) U.S. Cl.
CPC    *F16H 47/06* (2013.01); *B60K 6/26* (2013.01);
*B60K 6/405* (2013.01); *B60K 6/48* (2013.01);
(Continued)

(58) Field of Classification Search
CPC ....................................................... B60K 6/405
USPC ............................ 180/65.21, 65.22; 310/67 R
See application file for complete search history.

(56) References Cited

U.S. PATENT DOCUMENTS 6,092,985 A    7/2000    Winkam
(Continued)

FOREIGN PATENT DOCUMENTS

EP    2 287 487 A1    2/2011
(Continued)

OTHER PUBLICATIONS

International Search Report issued in International Patent Application No. PCT/JP2012/078189 mailed Dec. 4, 2012.

*Primary Examiner* — John Walters
*Assistant Examiner* — Brian Swenson
(74) *Attorney, Agent, or Firm* — Oliff PLC

(57) ABSTRACT

A vehicle drive device for a rotary electric machine. A case of the device includes a support wall portion that extends in a radial direction of the rotary electric machine at a location between the rotary electric machine and the fluid coupling in the axial direction. A first bearing and a second bearing that is separate from the first bearing are disposed at different positions in the radial direction from each other, the first bearing being configured to support the rotor member in the radial direction so as to be rotatable with respect to the support wall portion, and the second bearing being configured to support the coupling input member in the radial direction so as to be rotatable with respect to the support wall portion.

20 Claims, 3 Drawing Sheets

(51) Int. Cl.

| | | |
|---|---|---|
| *B60K 6/405* | (2007.10) | |
| *B60K 6/48* | (2007.10) | |
| *B60W 10/02* | (2006.01) | |
| *F16H 41/24* | (2006.01) | |
| *B60K 6/36* | (2007.10) | |
| *B60K 6/40* | (2007.10) | |
| *B60K 6/54* | (2007.10) | |
| *F16H 45/02* | (2006.01) | |

(52) U.S. Cl.
CPC ............. *B60W 10/026* (2013.01); *F16H 41/24* (2013.01); *F16H 2045/021* (2013.01); *F16H 2045/0284* (2013.01); *Y02T 10/6221* (2013.01); *B60K 6/36* (2013.01); *B60K 6/40* (2013.01); *B60K 6/54* (2013.01); *Y10S 903/902* (2013.01)

(56) References Cited

U.S. PATENT DOCUMENTS

| | | | |
|---|---|---|---|
| 7,114,604 B2 * | 10/2006 | Masuya | 192/3.29 |
| 7,191,856 B2 * | 3/2007 | Morishita et al. | 180/65.21 |
| 2006/0289209 A1 | 12/2006 | Grosspietsch et al. | |
| 2008/0099258 A1 * | 5/2008 | Berhan | 180/65.2 |
| 2008/0121446 A1 | 5/2008 | Sanji | |
| 2010/0038201 A1 * | 2/2010 | Mueller et al. | 192/3.29 |
| 2010/0105518 A1 * | 4/2010 | Kasuya et al. | 477/5 |
| 2010/0109461 A1 * | 5/2010 | Kato et al. | 310/90 |
| 2011/0121692 A1 | 5/2011 | Iwase et al. | |
| 2014/0128219 A1 * | 5/2014 | Frait et al. | 477/5 |

FOREIGN PATENT DOCUMENTS

| | | |
|---|---|---|
| JP | A-9-215270 | 8/1997 |
| JP | B2-3080612 | 8/2000 |
| JP | A-2006-137406 | 6/2006 |
| JP | A-2011-105188 | 6/2011 |
| JP | A-2011-106629 | 6/2011 |
| WO | WO 2008/065803 A1 | 6/2008 |

* cited by examiner

VEHICLE DRIVE DEVICE

INCORPORATION BY REFERENCE

The disclosure of Japanese Patent Application No. 2011-242701 filed on Nov. 4, 2011 including the specification, drawings and abstract is incorporated herein by reference in its entirety.

BACKGROUND OF THE INVENTION

The present invention relates to a vehicle drive device including a rotary electric machine, a fluid coupling disposed coaxially with the rotary electric machine, and a case that houses the rotary electric machine and the fluid coupling, the fluid coupling including a coupling input member drivably coupled to a rotor member of the rotary electric machine and a coupling output member drivably coupled to wheels.

DESCRIPTION OF THE RELATED ART

An example of the vehicle drive device described above according to the related art is described in Japanese Patent No. 3080612. In the description in the "Description of the Related Art" section, the names of members used in Japanese Patent No. 3080612 are cited in brackets for description. In the configuration described in Japanese Patent No. 3080612, as illustrated in FIG. 1 of Japanese Patent No. 3080612, a rotor member [a rotor 8] and a coupling input member [a pump bladed wheel 5] are fastened to each other, and a bearing [a radial bearing 9] is provided to integrally support the rotor member and the coupling input member in the radial direction so as to be rotatable with respect to a case [a casing 10].

In the configuration described in Japanese Patent No. 3080612, however, the coupling input member which forms a fluid coupling [a torque converter] which is heavyweight and the rotor member for which a high support accuracy in the radial direction is required are supported in the radial direction with respect to the case by a common bearing, and therefore it is necessary to use a relatively large bearing. Therefore, in the configuration according to Japanese Patent No. 3080612, restraints such as the size of the bearing itself and the arrangement of its surrounding support structure tend to make the bearing and the surrounding support structure large in size, which as a result may make the entire device large in size. In general, as the bearing becomes larger in size, a power loss due to rotation of the bearing tends to become larger. Therefore, in the configuration according to Japanese Patent No. 3080612, the energy efficiency of the device may be accordingly reduced as the bearing becomes large in size.

SUMMARY OF THE INVENTION

In view of the foregoing, it is desirable to provide a vehicle drive device that can easily achieve both a reduction in size of the entire device and an improvement in energy efficiency.

A vehicle drive device according to an aspect of the present invention includes a rotary electric machine, a fluid coupling disposed coaxially with the rotary electric machine on a first axial direction side with respect to the rotary electric machine, and a case that houses the rotary electric machine and the fluid coupling, the first axial direction side being one side in an axial direction with respect to the rotary electric machine, and the fluid coupling including a coupling input member drivably coupled to a rotor member of the rotary electric machine and a coupling output member drivably coupled to wheels. The case includes a support wall portion that extends in a radial direction of the rotary electric machine at a location between the rotary electric machine and the fluid coupling in the axial direction; and a first bearing and a second bearing that is separate from the first bearing are disposed at different positions in the radial direction from each other, the first bearing being configured to support the rotor member in the radial direction so as to be rotatable with respect to the support wall portion, and the second bearing being configured to support the coupling input member in the radial direction so as to be rotatable with respect to the support wall portion.

The term "drivably coupled" as used herein refers to a state in which two rotary elements are coupled to each other in such a way that enables transfer of a drive force, which includes a state in which the two rotary elements are coupled to each other to rotate together with each other, and a state in which the two rotary elements are coupled to each other via one or two or more transmission members in such a way that enables transfer of a drive force. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device.

The term "rotary electric machine" as used herein refers to any of a motor (electric motor), a generator (electric generator), and a motor generator that functions both as a motor and as a generator as necessary.

The term "fluid coupling" as used herein refers to any of a torque converter having a torque amplifying function and a normal fluid coupling having no torque amplifying function.

The term "extend" in a certain direction as used herein for the shape of a member is not limited to extension of the member in a direction parallel to a reference direction defined by the certain direction, and also includes extension of the member in a direction intersecting the reference direction and even extension of the member in a direction intersecting the reference direction at an intersection angle within a predetermined range.

According to the configuration described above, the rotor member and the coupling input member can be supported by the first bearing and the second bearing exclusively for the rotor member and the coupling input member, respectively. Therefore, the first bearing and the second bearing can be formed as small bearings, and the freedom in designing the arrangement of support structures around the bearings can be easily enhanced, compared to a case where the rotor member and the coupling input member are supported by a common bearing. As a result, the entire device can be reduced in size. With the first bearing and the second bearing formed as small bearings, it is easy to suppress a power loss due to rotation, which accordingly improves the energy efficiency of the device.

According to the configuration described above, further, the first bearing and the second bearing are disposed at different positions in the radial direction from each other. Hence, it is easy to reduce the axial length of the space occupied by the two bearings including their surrounding support structures.

The support wall portion may include a tubular projecting portion that projects to a second axial direction side that is an opposite side from the first axial direction side; and the first bearing may be disposed on an outer side in the radial direction with respect to the tubular projecting portion, and the second bearing is disposed on an inner side in the radial direction with respect to the tubular projecting portion.

According to the configuration, it is easy to dispose both the first bearing and the second bearing in the vicinity of the support wall portion (for example, the tubular projecting portion) without interfering with each other. Hence, support structures between both the first bearing and the second bearing and the support wall portion (for example, structures that fix both the first bearing and the second bearing to the support wall portion) can be simplified to make the space occupied by the bearings and their surrounding support structures small.

The vehicle drive device may further include: an input member drivably coupled to an internal combustion engine; and an engagement device provided in a power transfer path between the input member and the rotor member and capable of varying a state of engagement; and the engagement device may be disposed at a position at which the engagement device partially overlaps the first bearing as seen in the axial direction.

The engagement device described above is provided to disconnect the internal combustion engine from the wheels in order to suppress an energy loss due to a drag resistance of the internal combustion engine in the case where the vehicle is run by only torque of the rotary electric machine. According to the configuration described above, the radial length of the space occupied by the engagement device and the first bearing can be reduced by an amount by which the engagement device and the first bearing overlap each other as viewed in the axial direction.

In the configuration described above including the engagement device provided in the power transfer path between the input member and the rotor member and capable of varying a state of engagement, the rotor member may include a rotor body and a rotor support member that extends inward in the radial direction from the rotor body to support the rotor body; and the engagement device may be disposed on an inner side in the radial direction with respect to the rotor body and at a position at which the engagement device partially overlaps the rotor body as seen in the radial direction.

According to the configuration, the axial length of the space occupied by the engagement device and the rotor body can be reduced by an amount by which the engagement device and the rotor body overlap each other as viewed in the radial direction.

In the vehicle drive device with each of the configurations described above, the second bearing may be disposed at a position at which the second bearing partially overlaps the first bearing as seen in the radial direction.

According to the configuration, the axial length of the space occupied by the first bearing and the second bearing can be reduced by an amount by which the first bearing and the second bearing overlap each other as viewed in the radial direction.

The rotor member may include a rotor body and a rotor support member that extends inward in the radial direction from the rotor body to support the rotor body; the rotor support member may include an axially projecting portion that is a tubular projecting portion that projects to the first axial direction side; and an outer peripheral surface or an inner peripheral surface of the axially projecting portion may serve as a supported portion supported with respect to the support wall portion by the first bearing.

According to the configuration, the rotor support member can be appropriately supported in the radial direction with respect to the support wall portion, which makes it easy to make a clearance (an air gap) between the rotor body and a stator small. As a result, the rotary electric machine can be reduced in size while securing output torque.

The rotor member and the coupling input member may be drivably coupled to each other so as to be relatively movable in the axial direction.

According to the configuration, it is easy to maintain the rotor member at a constant position in the axial direction irrespective of the presence or absence of a load in the axial direction that may act on the coupling input member while appropriately securing transfer of torque between the rotor member and the coupling input member. Hence, it is possible to suppress the axial length of the rotor body to be short compared to a case where the rotor member and the coupling input member are drivably coupled to each other so as to be relatively immovable in the axial direction, which as a result reduces the rotary electric machine in size.

The support wall portion may include a tubular projecting portion that projects to a second axial direction side that is an opposite side from the first axial direction side; the tubular projecting portion may be disposed on an inner side in the radial direction with respect to the rotor member and at a position at which the tubular projecting portion partially overlaps the rotor member as seen in the radial direction; the vehicle drive device may further include a coupling portion that extends in the axial direction through a location on a radially inner side with respect to the tubular projecting portion and that extends on the second axial direction side with respect to a distal end portion of the tubular projecting portion to a location on an outer side in the radial direction with respect to the tubular projecting portion; and the rotor member and the coupling input member may be coupled to each other via the coupling portion.

According to the configuration, the axial length of the space occupied by the tubular projecting portion and the rotor member can be reduced by an amount by which the tubular projecting portion and the rotor member overlap each other as viewed in the radial direction in the case where the support wall portion includes the tubular projecting portion. In addition, the rotor member and the coupling input member, which are separately disposed on respective sides of the support wall portion in the axial direction, can be appropriately coupled to each other.

DETAILED DESCRIPTION OF THE EMBODIMENTS

A vehicle drive device according to an embodiment of the present invention will be described with reference to the drawings. In the following description, unless specifically differentiated, the "axial direction L", the "radial direction R", and the "circumferential direction" are defined with reference to the rotational axis of a rotary electric machine MG (an axis X illustrated in FIG. 2). The "first axial direction L1" indicates the direction from the rotary electric machine MG toward a torque converter TC along the axial direction L (toward the right in FIG. 2). The "second axial direction L2" indicates the direction opposite to the first axial direction L1 (toward the left in FIG. 2). The "radially inward direction R1" indicates the direction toward the inner side in the radial direction R. The "radially outward direction R2" indicates the direction toward the outer side in the radial direction R. Directions for each member indicate directions with that member assembled to the vehicle drive device 1. Terms related to the direction, the position, etc. of each member may allow a difference due to a manufacturing error.

1. OVERALL CONFIGURATION OF VEHICLE DRIVE DEVICE

Figure 1:
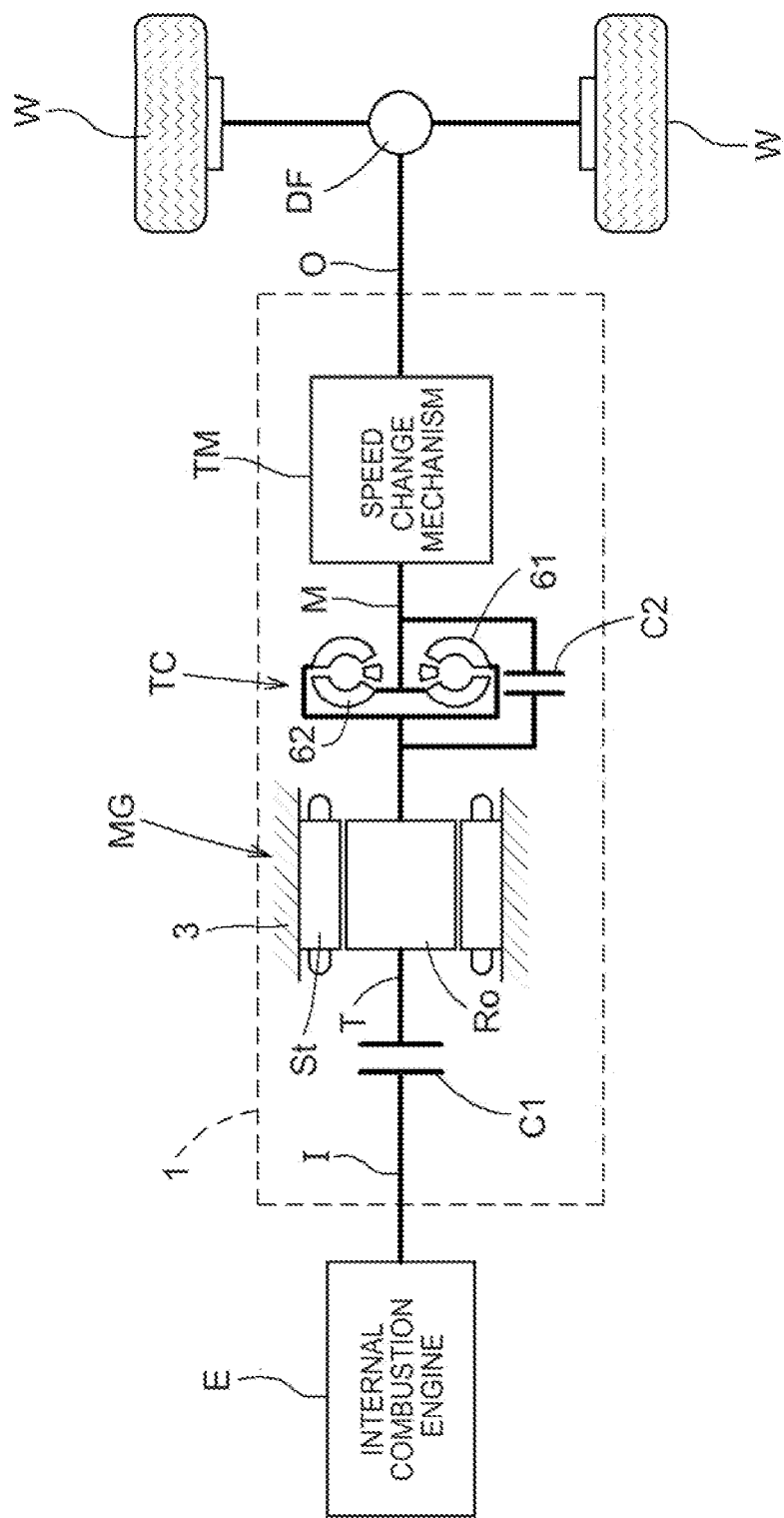
FIG. 1 is a schematic diagram illustrating a schematic configuration of a vehicle drive device according to an embodiment of the present invention.

FIG. 1 is a schematic diagram illustrating a schematic configuration of a vehicle drive device 1 according to the embodiment. As illustrated in FIG. 1, the vehicle drive device 1 includes a rotary electric machine MG, a torque converter TC, and a case 3 (see FIG. 2) that houses the rotary electric machine MG and the torque converter TC. The torque converter TC is drivably coupled to the rotary electric machine MG. Specifically, the torque converter TC is provided in a power transfer path between the rotary electric machine MG and an output shaft O. The output shaft O is drivably coupled to wheels W via an output differential gear device DF. Rotation and torque transferred to the output shaft O is distributed and transferred to the two, left and right, wheels W via the output differential gear device DF. This allows the vehicle drive device 1 to transfer torque of the rotary electric machine MG to the wheels W to run the vehicle. In the embodiment, the torque converter TC corresponds to the "fluid coupling" according to the present invention.

The vehicle drive device 1 according to the embodiment is capable of transferring torque of an internal combustion engine E to the wheels W to run the vehicle. That is, the vehicle drive device 1 includes an input shaft I drivably coupled to the internal combustion engine E. As illustrated in FIG. 1, the input shaft I, the rotary electric machine MG, the torque converter TC, and the output shaft O are provided in this order from the internal combustion engine E side in the power transfer path connecting between the internal combustion engine E and the wheels W. Consequently, the vehicle drive device 1 according to the embodiment is formed as a drive device for a hybrid vehicle (a hybrid drive device), specifically a hybrid drive device of a so-called one-motor parallel type, that uses one or both of the internal combustion engine E and the rotary electric machine MG as drive force sources for the vehicle. In the embodiment, the input shaft I corresponds to the "input member" according to the present invention.

The internal combustion engine E is a motor driven by combusting fuel inside the engine to take out power, and may be a gasoline engine, a diesel engine, or the like, for example. In the embodiment, the input shaft I is drivably coupled to an output shaft (such as a crankshaft) of the internal combustion engine E via a damper 16 (see FIG. 6; not illustrated in FIG. 1). The input shaft I may be drivably coupled to the output shaft of the internal combustion engine E not via the damper 16.

In the embodiment, as illustrated in FIG. 1, a first clutch C1 is disposed in the power transfer path between the input shaft I and the rotary electric machine MG. The first clutch C1 functions as an internal combustion engine cut-off clutch that disconnects the internal combustion engine E from the wheels W. A speed change mechanism TM is disposed in the power transfer path between the torque converter TC and the output shaft O. The speed change mechanism TM is formed as a mechanism capable of changing the speed ratio stepwise or continuously (such as a stepped automatic transmission, for example), and transfers rotation of an intermediate shaft M (a transmission input shaft) to the output shaft O (a transmission output shaft) with the rotational speed changed with a predetermined speed ratio. In the embodiment, the first clutch C1 corresponds to the "engagement device" according to the present invention.

Figure 2:
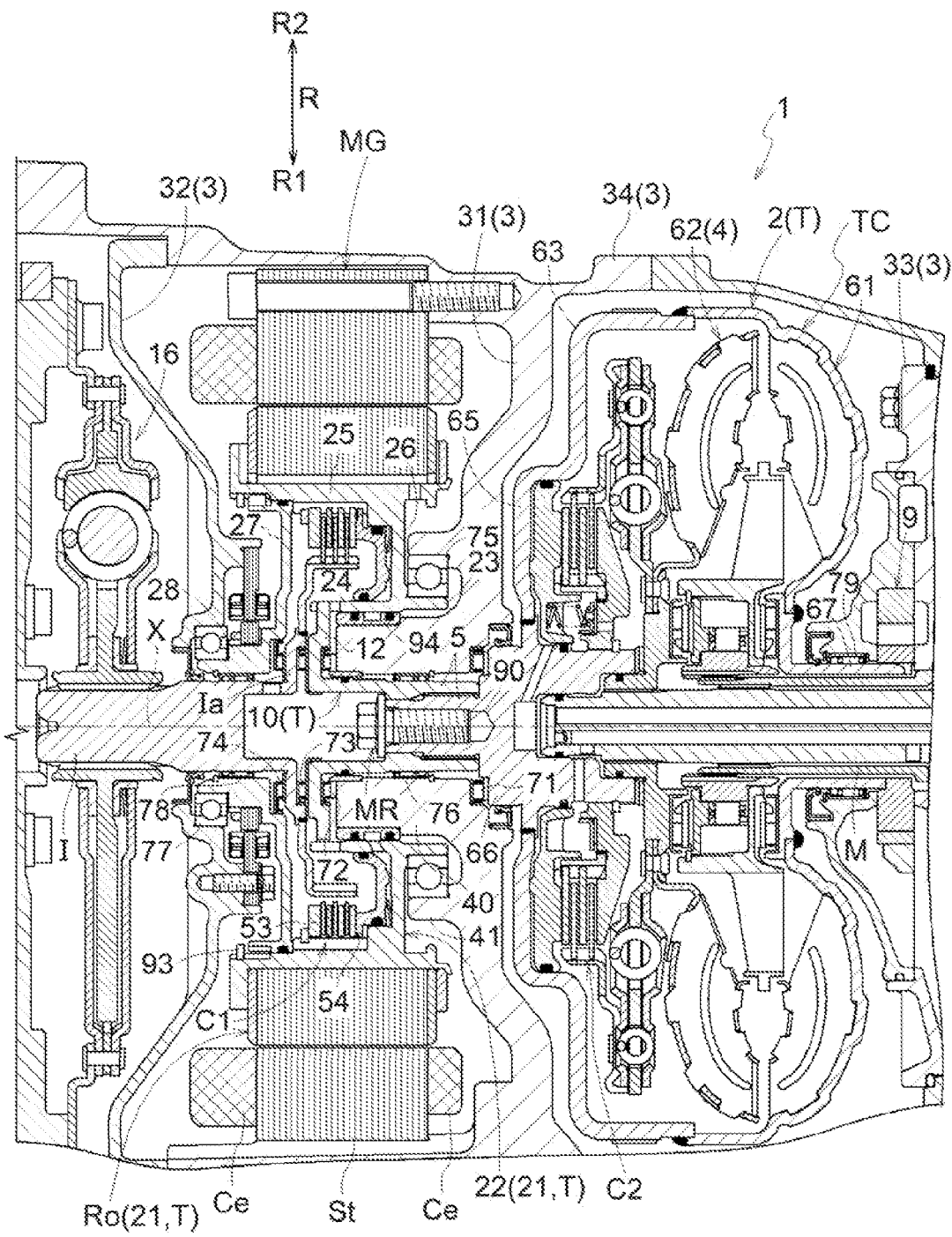
FIG. 2 is a partial sectional view of the vehicle drive device according to the embodiment of the present invention.

In the embodiment, the input shaft I, the first clutch C1, the rotary electric machine MG, the torque converter TC, the speed change mechanism TM, and the output shaft O are all disposed on the axis X (see FIG. 2). The vehicle drive device 1 according to the embodiment has a single-axis configuration suitable to be mounted to FR (Front Engine Rear Drive) vehicles.

2. CONFIGURATION OF VARIOUS COMPONENTS OF DRIVE DEVICE

Figure 3:
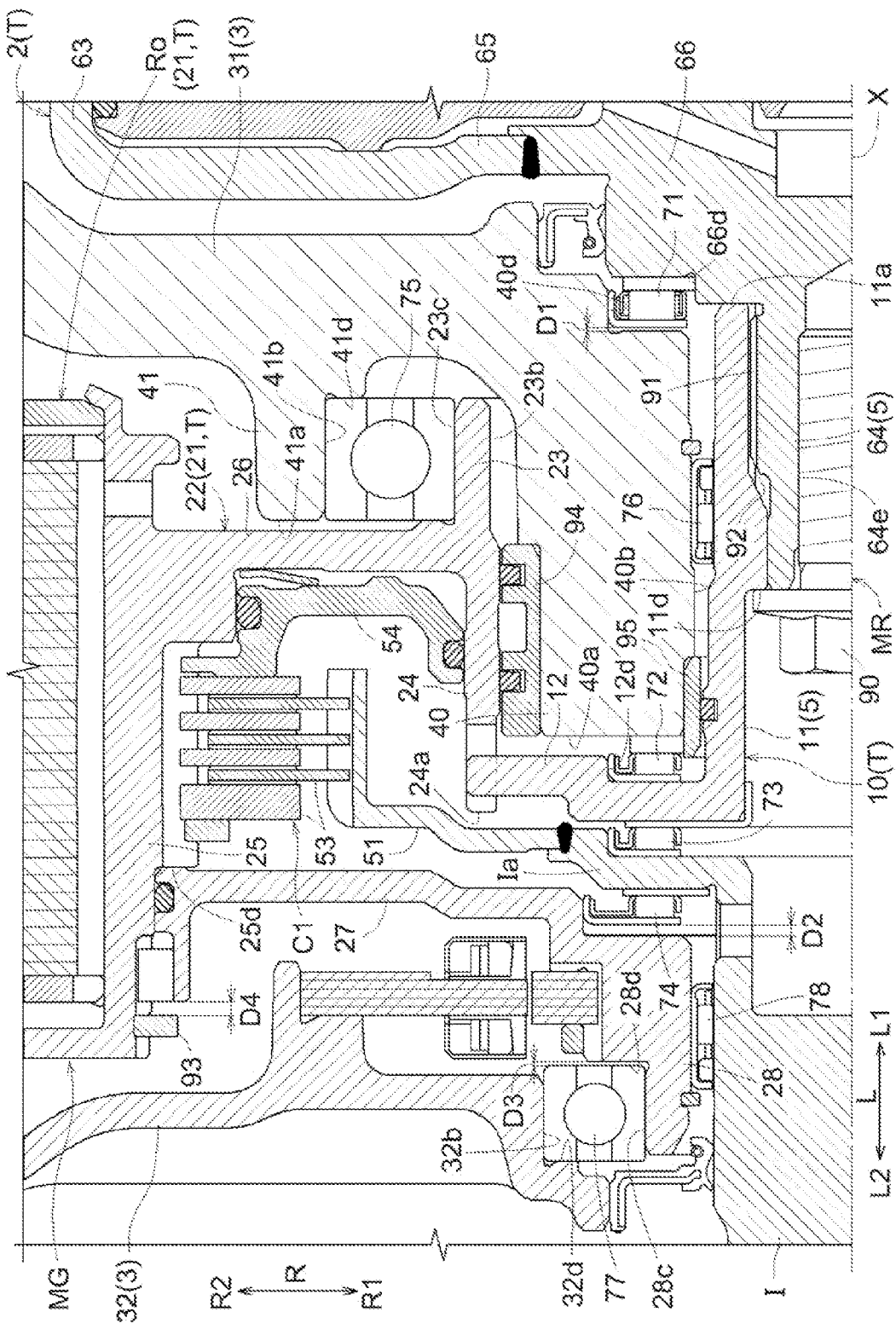
FIG. 3 is a partial enlarged view of FIG. 2.

Next, the configuration of various components of the vehicle drive device 1 according to the embodiment will be described with reference to FIGS. 2 and 3. FIG. 2 is a sectional view of a part of the vehicle drive device 1 according to the embodiment taken along a plane including the axis X. FIG. 3 is a partial enlarged view of FIG. 2.

2-1. Case

In the embodiment, as illustrated in FIG. 2, the case 3 includes a first support wall portion 31, a second support wall portion 32, a third support wall portion 33, and a peripheral wall portion 34. The peripheral wall portion 34 is formed in a generally cylindrical shape to cover the outer periphery of the rotary electric machine MG, the first clutch C1, the torque converter TC, and so forth. The second support wall portion 32, the first support wall portion 31, and the third support wall portion 33 are disposed in this order from a second axial direction L2 side as one side in the axial direction L in order to partition an in-case space, formed on a radially inward direction R1 side as an inner side in the radial direction R with respect to the peripheral wall portion 34, in the axial direction L. In the embodiment, the first support wall portion 31 corresponds to the "support wall portion" according to the present invention.

As illustrated in FIG. 2, the rotary electric machine MG and the first clutch C1 are housed in a space within the case 3 between the first support wall portion 31 and the second support wall portion 32. In the embodiment, the space between the first support wall portion 31 and the second support wall portion 32 is formed in such a shape that a portion on the radially inward direction R1 side is shorter in length in the axial direction L than a portion on a radially outward direction R2 side as an outer side in the radial direction R. The torque converter TC is housed in a space within the case 3 between the first support wall portion 31 and the third support wall portion 33. The damper 16 is housed in a space within the case 3 on the second axial direction L2 side with respect to the second support wall portion 32.

The first support wall portion 31 is formed between the rotary electric machine MG and the torque converter TC in the axial direction L to extend in the radial direction R. In the embodiment, the first support wall portion 31 is a wall portion in the shape of a circular plate that extends in the circumferential direction in addition to the radial direction R. A through hole (hereinafter referred to as a "first through hole") that penetrates in the axial direction L is formed in the center portion of the first support wall portion 31 in the radial direction R. The first support wall portion 31 is shaped such that a portion on the radially inward direction R1 side is offset in the axial direction L so as to be positioned on the second axial direction L2 side with respect to a portion on the radially outward direction R2 side.

The first support wall portion 31 includes a first tubular projecting portion 40 that projects to the second axial direction tion L2 side. In the embodiment, the first tubular projecting portion 40 is disposed coaxially with the axis X at the center portion of the first support wall portion 31 in the radial direction R. An inner peripheral surface 40b (see FIG. 3) of the first tubular projecting portion 40 forms the outer edge portion of the first through hole. That is, the first tubular projecting portion 40 serves as a thick-walled portion (a boss portion) having a predetermined thickness in the axial direction L and formed at an end portion of the first support wall portion 31 on the radially inward direction R1 side. In the embodiment, the first tubular projecting portion 40 corresponds to the "tubular projecting portion" according to the present invention.

The first tubular projecting portion 40 is disposed on the radially inward direction R1 side with respect to a rotor member 21 to be discussed later and at a position at which the first tubular projecting portion 40 partially overlaps the rotor member 21 as seen in the radial direction R. The phrase "partially overlap as seen in a predetermined direction" as used herein for the arrangement of two members indicates that when the viewing direction is determined as the predetermined direction and the viewpoint is moved in directions orthogonal to the viewing direction, the two members are seen as overlapping each other from the viewpoint in some region.

In the embodiment, as illustrated in FIG. 3, a distal end portion 40a of the first tubular projecting portion 40 on the second axial direction L2 side is disposed at a position in the axial direction L at which the distal end portion 40a overlaps the center region of the rotary electric machine MG in the axial direction L as seen in the radial direction R, and a base end portion of the first tubular projecting portion 40 on a first axial direction L1 side as an opposite side from the axial direction L2 side is positioned on the first axial direction L1 side with respect to an end portion of the rotor member 21 on the first axial direction L1 side. A part of a power transfer member T to be discussed later is disposed on the radially inward direction R1 side with respect to the first tubular projecting portion 40, that is, inside the first through hole. A stepped portion 40d having a surface (in the example, a cylindrical surface) that faces the radially inward direction R1 side is formed at a side surface portion of the first tubular projecting portion 40 on the first axial direction L1 side.

The first support wall portion 31 includes a second tubular projecting portion 41 that is larger in diameter than the first tubular projecting portion 40. As with the first tubular projecting portion 40, the second tubular projecting portion 41 is formed to project to the second axial direction L2 side, and disposed coaxially with the axis X. As illustrated in FIG. 3, the amount of projection of the second tubular projecting portion 41 is less than the amount of projection of the first tubular projecting portion 40, and a distal end portion 41a of the second tubular projecting portion 41 on the second axial direction L2 side is positioned on the first axial direction L1 side with respect to the distal end portion 40a of the first tubular projecting portion 40. The second tubular projecting portion 41 is formed to be smaller in thickness in the radial direction R than the first tubular projecting portion 40. An inner peripheral stepped portion 41d having a surface (in the example, an annular surface) that faces the second axial direction L2 side is formed on an inner peripheral surface 41b of the second tubular projecting portion 41. With the inner peripheral stepped portion 41d serving as the boundary, a portion on the second axial direction L2 side with respect to the inner peripheral stepped portion 41d is defined as a large diameter portion, and a portion on the first axial direction L1 side with respect to the inner peripheral stepped portion 41d is defined as a small diameter portion.

As illustrated in FIG. 2, the second support wall portion 32 is formed on the second axial direction L2 side with respect to the rotary electric machine MG (in the example, between the rotary electric machine MG and the damper 16 in the axial direction L) to extend in the radial direction R. In the embodiment, the second support wall portion 32 is a wall portion in the shape of a circular plate that extends in the circumferential direction in addition to the radial direction R. A through hole (hereinafter referred to as a "second through hole") that extends in the axial direction L is formed in the center portion of the second support wall portion 32 in the radial direction R. The input shaft I is inserted into the second through hole. The second support wall portion 32 is shaped such that a portion on the radially inward direction R1 side is offset in the axial direction L so as to be positioned on the first axial direction L1 side with respect to a portion on the radially outward direction R2 side. As illustrated in FIG. 3, an inner peripheral stepped portion 32d having a surface (in the example, an annular surface) that faces the first axial direction L1 side is formed on an inner peripheral surface 32b of a portion of the second support wall portion 32 on the radially inward direction R1 side that forms the outer edge portion of the second through hole. With the inner peripheral stepped portion 32d serving as the boundary, a portion on the first axial direction L1 side with respect to the inner peripheral stepped portion 32d is defined as a large diameter portion, and a portion on the second axial direction L2 side with respect to the inner peripheral stepped portion 32d is defined as a small diameter portion.

As illustrated in FIG. 2, the third support wall portion 33 is formed on the first axial direction L1 side with respect to the torque converter TC (in the example, between the torque converter TC and the speed change mechanism TM (see FIG. 1) in the axial direction L) to extend in the radial direction R. In the embodiment, the third support wall portion 33 is a wall portion in the shape of a flat circular plate that extends in the circumferential direction in addition to the radial direction R. A through hole (hereinafter referred to as a "third through hole") that extends in the axial direction L is formed in the center portion of the second support wall portion 32 in the radial direction R. The intermediate shaft M is inserted into the third through hole. The third support wall portion 33 is provided with an oil pump 9. A pump drive shaft 67 that drives the oil pump 9 is drivably coupled to a pump impeller 61, to be discussed later, of the torque converter TC so as to rotate together with the pump impeller 61. This allows the oil pump 9 to discharge oil along with rotation of the pump impeller 61, generating a hydraulic pressure for supplying oil to various components of the vehicle drive device 1. The pump drive shaft 67 is supported in the radial direction R so as to be rotatable with respect to the third support wall portion 33 via a ninth bearing 79 (in the example, a needle bearing) and a pump case.

2-2. Rotary Electric Machine

As illustrated in FIG. 2, the rotary electric machine MG is disposed between the first support wall portion 31 and the second support wall portion 32 in the axial direction L. In the embodiment, oil discharged from the oil pump 9 is supplied to a space partitioned by the first support wall portion 31 and the second support wall portion 32 on both sides in the axial direction L and partitioned by the peripheral wall portion 34 on the radially outward direction R2 side to cool the rotary electric machine MG.

As illustrated in FIG. 2, the rotary electric machine MG includes a stator St fixed to the case 3, and the rotor member 21. The stator St includes coil end portions Ce provided on respective sides in the axial direction L. The rotor member 21 includes a rotor Ro and a rotor support member 22 that extends in the radially inward direction R1 from the rotor Ro to support the rotor Ro. The rotor Ro is disposed on the radially inward direction R1 side with respect to the stator St, and supported so as to be rotatable with respect to the case 3 via the rotor support member 22 which rotates together with the rotor Ro. In the embodiment, the rotor Ro corresponds to the "rotor body" according to the present invention.

The rotor support member 22 is a member that supports the rotor Ro from the radially inward direction R1 side. In the embodiment, the rotor support member 22 includes a rotor holding portion 25 that holds the rotor Ro, and a radially extending portion 26. The rotor holding portion 25 is disposed coaxially with the axis X, and formed in the shape of a cylinder having an outer peripheral portion that contacts the inner peripheral surface of the rotor Ro and flange portions that contact both side surfaces of the rotor Ro in the axial direction L. The radially extending portion 26 is formed integrally with the rotor holding portion 25, and formed to extend in the radially inward direction R1 from a portion of the rotor holding portion 25 on the first axial direction L1 side with respect to the center portion of the rotor holding portion 25 in the axial direction L. The radially extending portion 26 is formed as an annular plate-like portion that extends in the circumferential direction in addition to the radial direction R. In the embodiment, the radially extending portion 26 is formed to extend in parallel to the radial direction R such that an end portion of the radially extending portion 26 on the radially inward direction R1 side is positioned on the radially outward direction R2 side with respect to the outer peripheral surface of the first tubular projecting portion 40. In the embodiment, as illustrated in FIG. 3, a first sleeve member 94 is disposed in a gap in the radial direction R between an end portion of the radially extending portion 26 on the radially inward direction R1 side (in the example, the inner peripheral surface of a second axially projecting portion 24 to be discussed later) and the outer peripheral surface of the first tubular projecting portion 40. The first sleeve member 94 is provided to restrain passage of oil in the axial direction L through the gap.

The radially extending portion 26 includes a first axially projecting portion 23 that is a tubular projecting portion that projects to the first axial direction L1 side. The first axially projecting portion 23 is disposed coaxially with the axis X. In the embodiment, the first axially projecting portion 23 is formed integrally with the radially extending portion 26 at an end portion of the radially extending portion 26 on the radially inward direction R1 side. As illustrated in FIG. 3, the first axially projecting portion 23 is disposed between the first tubular projecting portion 40 and the second tubular projecting portion 41 in the radial direction R and at a position at which the first axially projecting portion 23 partially overlaps the second tubular projecting portion 41 as seen in the radial direction R. A space partitioned by an outer peripheral surface 23c of the first axially projecting portion 23 and the inner peripheral surface 41b of the second tubular projecting portion 41 on both sides in the radial direction R and partitioned by the radially extending portion 26 and the first support wall portion 31 (the inner peripheral stepped portion 41d of the second tubular projecting portion 41) on both sides in the axial direction L serves as a bearing placement space for placement of a first bearing 75 to be discussed later. In the embodiment, the first axially projecting portion 23 corresponds to the "axially projecting portion" according to the present invention.

The radially extending portion 26 also includes a second axially projecting portion 24 that is a tubular projecting portion that projects to the second axial direction L2 side. The second axially projecting portion 24 is disposed coaxially with the axis X. In the embodiment, the second axially projecting portion 24 is formed integrally with the radially extending portion 26 at an end portion of the radially extending portion 26 on the radially inward direction R1 side. As illustrated in FIG. 3, a distal end portion 24a of the second axially projecting portion 24 on the second axial direction L2 side is positioned on the second axial direction L2 side with respect to the distal end portion 40a of the first tubular projecting portion 40.

A plate-like member 27 is attached to the rotor support member 22. The plate-like member 27 is formed as an annular plate-like member that extends in the circumferential direction in addition to the radial direction R. In the embodiment, as illustrated in FIG. 3, the plate-like member 27 is provided such that the outer peripheral surface of the plate-like member 27 is fitted (in the example, spline-fitted) with the inner peripheral surface of a portion of the rotor holding portion 25 on the second axial direction L2 side with respect to the center portion of the rotor holding portion 25 in the axial direction L. This allows the plate-like member 27 to rotate together with the rotor support member 22. An inner peripheral stepped portion 25d having a surface (in the example, an annular surface) that faces the second axial direction L2 side is formed on the inner peripheral surface of the rotor holding portion 25. With the inner peripheral stepped portion 25d serving as the boundary, a portion on the second axial direction L2 side with respect to the inner peripheral stepped portion 25d is defined as a large diameter portion, and a portion on the first axial direction L1 side with respect to the inner peripheral stepped portion 25d is defined as a small diameter portion. A snap ring 93 is retained on a portion of the inner peripheral surface of the rotor holding portion 25 that is opposite in the axial direction L to the inner peripheral stepped portion 25d with respect to the outer peripheral surface of the plate-like member 27. The plate-like member 27 attached to the rotor holding portion 25 is restrained from moving in the first axial direction L1 by the inner peripheral stepped portion 25d and from moving in the second axial direction L2 by the snap ring 93 with some movement allowed in the axial direction L with respect to the rotor holding portion 25. FIG. 3 illustrates a state in which a gap in the axial direction L (a fourth gap D4) is provided between the plate-like member 27 and the snap ring 93 with the plate-like member 27 abutting against a surface of the inner peripheral stepped portion 25d that faces the second axial direction L2 side.

In the embodiment, the plate-like member 27 is shaped such that a portion on the radially inward direction R1 side is offset in the axial direction L so as to be positioned on the second axial direction L2 side with respect to a portion on the radially outward direction R2 side. A thick-walled portion 28 is formed at an end portion of the plate-like member 27 on the radially inward direction R1 side. The thick-walled portion 28 has a large thickness in the axial direction L compared to a portion of the plate-like member 27 on the radially outward direction R2 side. An outer peripheral stepped portion 28d having a surface (in the example, an annular surface) that faces the second axial direction L2 side is formed on an outer peripheral surface 28c of the thick-walled portion 28. With the outer peripheral stepped portion 28d serving as the boundary, a portion on the first axial direction L1 side with respect to the outer peripheral stepped portion 28d is defined as a large diameter portion, and a portion on the second axial direction L2 side with respect to the outer peripheral stepped portion 28d is defined as a small diameter portion. The outer peripheral stepped portion 28d of the plate-like member 27 is positioned on the first axial direction L1 side with respect to the inner peripheral stepped portion 32*d* of the second support wall portion 32. A space partitioned by the outer peripheral surface 28*c* of the thick-walled portion 28 of the plate-like member 27 and the inner peripheral surface 32*b* of the second support wall portion 32 on both sides in the radial direction R and partitioned by the outer peripheral stepped portion 28*d* of the plate-like member 27 and the inner peripheral stepped portion 32*d* of the second support wall portion 32 on both sides in the axial direction L serves as a bearing placement space for placement of a seventh bearing 77 to be discussed later.

2-3. First Clutch

The first clutch C1 is a device provided in a power transfer path between the input shaft I and the rotor member 21 and capable of varying the state of engagement. That is, the first clutch C1 is capable of switching the state of engagement of two engagement members to be engaged by the first clutch C1 between a state in which the two engagement members are engaged with each other (including a slip engagement state) and a state in which the two engagement members are not engaged with (disengaged from) each other. A drive force is transferred between the input shaft I and the rotor member 21 with the two engagement members engaged with each other. A drive force is not transferred between the input shaft I and the rotor member 21 with the two engagement members disengaged from each other.

As illustrated in FIG. 3, the first clutch C1 is disposed between the radially extending portion 26 and the plate-like member 27 in the axial direction L. The first clutch C1 is disposed on the radially inward direction R1 side with respect to the rotor RO and at a position at which the first clutch C1 partially overlaps the rotor Ro as seen in the radial direction R. In the embodiment, the first clutch C1 is disposed at a position in the axial direction L at which the first clutch C1 overlaps the center region of the rotor Ro in the axial direction L as seen in the radial direction R.

In the embodiment, the first clutch C1 includes a clutch hub 51, a friction member 53, and a piston 54, and is formed as a wet multi-plate clutch mechanism. In the embodiment, the rotor holding portion 25 of the rotor support member 22 functions as a clutch drum. The first clutch C1 includes a pair of an input-side friction member and an output-side friction member as the friction member 53. The input-side friction member is supported from the radially inward direction R1 side by the outer peripheral portion of the clutch hub 51. The output-side friction member is supported from the radially outward direction R2 side by the inner peripheral portion of the rotor holding portion 25.

A portion of the clutch hub 51 excluding the portion for holding the friction member 53 is formed as an annular plate-like portion that extends in the radial direction R and the circumferential direction. An end portion of the annular plate-like portion on the radially inward direction R1 side is coupled (in the example, welded) to a flange portion Ia of the input shaft I. Oil discharged from the oil pump 9 is supplied to a space partitioned by the radially extending portion 26 and the plate-like member 27 on both sides in the axial direction L and partitioned by the rotor holding portion 25 on the radially outward direction R2 side to cool the friction member 53.

2-4. Torque Converter

As illustrated in FIG. 2, the torque converter TC is disposed coaxially with the rotary electric machine MG on the first axial direction L1 side with respect to the rotary electric machine MG. The torque converter TC is disposed between the first support wall portion 31 and the third support wall portion 33 in the axial direction L. The torque converter TC includes a coupling input member 2 drivably coupled to the rotor member 21 of the rotary electric machine MG, and a coupling output member 4 drivably coupled to the wheels W.

As illustrated in FIG. 2, the torque converter TC includes the pump impeller 61, a turbine runner 62, a second clutch C2 that serves as a lock-up clutch, and a cover portion 63 that houses such components. The cover portion 63 is coupled so as to rotate together with the pump impeller 61 disposed inside the cover portion 63. As discussed above, the pump drive shaft 67 is coupled to the cover portion 63 so as to rotate together with the cover portion 63. In the embodiment, the coupling input member 2 is formed from the pump impeller 61, the cover portion 63, and the pump drive shaft 67. In the embodiment, as discussed in detail later, the coupling input member 2 is drivably coupled to the rotor member 21 via a coupling member 10. In the embodiment, as discussed later, the coupling input member 2 and the rotor member 21 are drivably coupled to each other so as to be relatively movable in the axial direction.

The coupling output member 4 is formed from the turbine runner 62. The turbine runner 62 is drivably coupled to the intermediate shaft M. Consequently, as illustrated in FIG. 1, the coupling output member 4 is drivably coupled to the wheels W via the intermediate shaft M, the speed change mechanism TM, the output shaft O, and the output differential gear device DF. In the embodiment, the turbine runner 62 and the intermediate shaft M are drivably coupled to each other through spline fitting so as to be relatively movable in the axial direction L and rotate together with each other with some backlash (play) in the circumferential direction.

As illustrated in FIG. 3, the cover portion 63 includes a cover radially extending portion 65 provided on the first axial direction L1 side with respect to the first support wall portion 31 to extend in the radial direction R, and a cover tubular projecting portion 64 formed in the shape of a tube that projects to the second axial direction L2 side from the cover radially extending portion 65 (in the example, an end portion of the cover radially extending portion 65 on the radially inward direction R1 side). The cover radially extending portion 65 is formed to extend in the radially outward direction R2 from an end portion of the cover tubular projecting portion 64 on the first axial direction L1 side. In the example, the cover radially extending portion 65 is formed as an annular plate-like portion that extends in the circumferential direction in addition to the radial direction R. A thick-walled portion 66 is formed at a portion of the cover radially extending portion 65 on the side of the cover tubular projecting portion 64. The thick-walled portion 66 has a large thickness in the axial direction L compared to a portion of the cover radially extending portion 65 on the radially outward direction R2 side. The cover tubular projecting portion 64 is disposed coaxially with the axis X. First spline teeth 91 that extend in the axial direction L are formed on the outer peripheral surface (in the example, on only a portion of the outer peripheral surface on the base end side) of the cover tubular projecting portion 64. A fastening hole 64*e* for fastening of a fastening member 90 is formed in a portion of the cover tubular projecting portion 64 on the radially inward direction R1 side. In the embodiment, the cover radially extending portion 65 and the cover tubular projecting portion 64 are formed integrally with each other.

As illustrated in FIG. 3, the cover radially extending portion 65 is disposed away from the first support wall portion 31 such that a gap in the axial direction L is formed between the first support wall portion 31 and the cover radially extending portion 65. A gap in the axial direction L between a side surface portion of the cover radially extending portion 65 on the second axial direction L2 side and a side surface portion of the first support wall portion 31 on the first axial direction L1 side serves as a bearing placement space for placement of a fifth bearing 71 to be discussed later. Specifically, as described above, the stepped portion 40d is formed at a side surface portion of the first tubular projecting portion 40 of the first support wall portion 31 on the first axial direction L1 side. A stepped portion 66d having a surface (in the example, a cylindrical surface) that faces the radially outward direction R2 side is formed at a side surface portion of the cover radially extending portion 65 on the second axial direction L2 side positioned on the radially inward direction R1 side with respect to the stepped portion 40d. In the example, the stepped portion 66d is formed at the thick-walled portion 66 of the cover radially extending portion 65. A space partitioned by the stepped portion 40d of the first support wall portion 31 (specifically, the first tubular projecting portion 40) and the stepped portion 66d of the cover radially extending portion 65 (specifically, the thick-walled portion 66) on both sides in the radial direction R and partitioned by the first support wall portion 31 (specifically, the first tubular projecting portion 40) and the cover radially extending portion 65 (specifically, the thick-walled portion 66) on both sides in the axial direction L serves as a bearing placement space for placement of the fifth bearing 71 to be discussed later.

2-3. Power Transfer Member

The power transfer member T is formed by coupling the rotor member 21 and the coupling input member 2 so as to rotate in conjunction with each other. The phrase "in conjunction with" means that the ratio in rotational speed between the rotor member 21 and the coupling input member 2 is determined at a constant value. In the embodiment, the power transfer member T is formed by coupling the rotor member 21 and the coupling input member 2 so as to rotate together with each other. In the embodiment, the rotor member 21 and the coupling input member 2 are coupled to each other via the coupling member 10 to be discussed below. That is, in the embodiment, the power transfer member T is configured to include the rotor member 21, the coupling input member 2, and the coupling member 10.

As illustrated in FIG. 3, the coupling member 10 is formed to extend in the axial direction L through a location on the radially inward direction R1 side with respect to the first tubular projecting portion 40 to a location on the radially outward direction R2 side with respect to the first tubular projecting portion 40 on the second axial direction L2 side with respect to the distal end portion 40a of the first tubular projecting portion 40. In other words, the coupling member 10 includes a coupling radially extending portion 12 provided on the second axial direction L2 side with respect to the first support wall portion 31 to extend in the radial direction R, and a coupling tubular projecting portion 11 formed in the shape of a tube that projects to the first axial direction L1 side from the coupling radially extending portion 12. The coupling tubular projecting portion 11 is disposed on the radially inward direction R1 side with respect to the first tubular projecting portion 40. The coupling radially extending portion 12 is formed to extend in the radially outward direction R2 from an end portion of the coupling tubular projecting portion 11 on the second axial direction L2 side. In the example, the coupling radially extending portion 12 is formed as an annular plate-like portion that extends in the circumferential direction in addition to the radial direction R. In the embodiment, the coupling radially extending portion 12 and the coupling tubular projecting portion 11 are formed integrally with each other. In the embodiment, the coupling member 10 forms the "coupling portion" according to the present invention.

The coupling tubular projecting portion 11 is disposed coaxially with the axis X. Second spline teeth 92 that extend in the axial direction L are formed on the inner peripheral surface (in the example, on only a portion of the inner peripheral surface on the distal end side) of the coupling tubular projecting portion 11. The second spline teeth 92 are configured to engage with the first spline teeth 91 formed on the outer peripheral surface of the cover tubular projecting portion 64. As illustrated in FIG. 3, the cover portion 63 and the coupling member 10 are coupled to each other through spline fitting by the spline teeth 91 and 92 with the inner peripheral surface of the coupling tubular projecting portion 11 externally fitted with the outer peripheral surface of the cover tubular projecting portion 64. That is, the cover portion 63 (the coupling input member 2) and the coupling member 10 are coupled to each other so as to rotate together with each other. The cover tubular projecting portion 64 and the coupling tubular projecting portion 11 which are coupled to each other through spline fitting form an axially extending portion 5 of the power transfer member T that extends in the axial direction L through a location on the radially inward direction R1 side with respect to the first support wall portion 31.

The cover tubular projecting portion 64 and the coupling tubular projecting portion 11 are spline-coupled to each other by the spline teeth 91 and 92 which extend in the axial direction L. Therefore, relative movement in the axial direction L between the cover radially extending portion 65, which is formed integrally with the cover tubular projecting portion 64, and the coupling radially extending portion 12, which is formed integrally with the coupling tubular projecting portion 11, is not restrained by the spline coupling. In the embodiment, in this respect, in order for the first support wall portion 31 (specifically, the first tubular projecting portion 40) to restrain both movement of the coupling input member 2 in the first axial direction L1 and movement of the coupling input member 2 in the second axial direction L2, the cover radially extending portion 65 and the coupling radially extending portion 12, which are disposed on respective sides across the first tubular projecting portion 40 in the axial direction L, are configured to be coupled to each other with relative movement in the axial direction L between the cover radially extending portion 65 and the coupling radially extending portion 12 via the axially extending portion 5 restrained. Such a configuration is achieved by providing a movement restraining mechanism MR to be described below.

The movement restraining mechanism MR is a mechanism that restrains relative movement in the axial direction L between the cover tubular projecting portion 64 and the coupling tubular projecting portion 11. In the embodiment, as illustrated in FIG. 3, an end surface (a distal end portion 11a) of the coupling tubular projecting portion 11 on the first axial direction L1 side abuts against the cover radially extending portion 65 (in the example, the thick-walled portion 66), and a surface of the fastening member 90, which is fastened to the cover tubular projecting portion 64, that faces the first axial direction L1 side abuts against a surface of the coupling tubular projecting portion 11 that faces the second axial direction L2 side, thereby forming the movement restraining mechanism MR. Specifically, in the embodiment, an inner peripheral stepped portion 11d having a surface (in the example, an annular surface) that faces the second axial direction L2 side is formed on the inner peripheral surface of the coupling tubular projecting portion 11. The fastening member 90 (in the example, a fastening bolt) has an annular portion (in the example, a bolt head portion of a flanged bolt) that projects to the radially outward direction R2 side with respect to the outer peripheral surface of the cover tubular projecting portion 64 with the fastening member 90 fastened to the fastening hole 64e of the cover tubular projecting portion 64. The annular portion of the fastening member 90 abuts against a surface of the inner peripheral stepped portion 11d that faces the second axial direction L2 side, thereby forming the movement restraining mechanism MR.

The coupling radially extending portion 12 is coupled to the rotor support member 22 at a location on the radially outward direction R2 side with respect to the first tubular projecting portion 40. In the embodiment, an end portion of the coupling radially extending portion 12 on the radially outward direction R2 side and an end portion (the distal end portion 24a) of the second axially projecting portion 24 of the rotor support member 22 on the second axial direction L2 side are coupled (engaged) so as to be relatively movable in the axial direction L and rotate together with each other. Specifically, an end portion of the coupling radially extending portion 12 on the radially outward direction R2 side is formed as an externally toothed engagement portion in which a plurality of engagement pieces that project to the radially outward direction R2 side are distributed in the circumferential direction. The distal end portion 24a of the second axially projecting portion 24 is formed as a cylindrical engagement portion in which a plurality of (the same number as the engagement pieces) through holes that extend in the radial direction R and that have such a width in the circumferential direction and a length in the axial direction L that enable insertion of the engagement pieces are distributed in the circumferential direction. In the example, the through holes are formed as through holes, formed in a U shape as seen in the radial direction R, that open in an end edge of the second axially projecting portion 24 on the second axial direction L2 side and that are larger in length in the axial direction L than the engagement pieces. Such a splined engagement mechanism couples the second axially projecting portion 24 and the coupling radially extending portion 12 so as to be relatively movable in the axial direction L and rotate together with each other. As a result, the rotor member 21 and the coupling radially extending portion 12, in other words, the rotor member 21 and the coupling input member 2, are drivably coupled to each other so as to be relatively movable in the axial direction L.

The outer peripheral surface of the coupling tubular projecting portion 11 is disposed on the radially inward direction R1 side with respect to the inner peripheral surface 40b of the first tubular projecting portion 40. A gap in the radial direction R between the outer peripheral surface of the coupling tubular projecting portion 11 and the inner peripheral surface 40b of the first tubular projecting portion 40 serves as a bearing placement space for placement of a second bearing 76 to be discussed later. A second sleeve member 95 is disposed in a portion of the gap on the second axial direction L2 side with respect to the second bearing 76. The second sleeve member 95 is provided to restrain passage of oil in the axial direction L through the gap.

The coupling radially extending portion 12 is disposed with its side surface portion on the first axial direction L1 side positioned on the second axial direction L2 side with respect to the distal end portion 40a of the first tubular projecting portion 40 such that a gap in the axial direction L is formed between the distal end portion 40a and the side surface portion of the coupling radially extending portion 12. A gap in the axial direction L between the side surface portion of the coupling radially extending portion 12 on the first axial direction L1 side and the distal end portion 40a of the first tubular projecting portion 40 serves as a bearing placement space for placement of a sixth bearing 72 to be discussed later. In the embodiment, a stepped portion 12d having a surface (in the example, a cylindrical surface) that faces the radially inward direction R1 side is formed at a side surface portion of the coupling radially extending portion 12 on the first axial direction L1 side. The second sleeve member 95 is disposed so as to partially project to the second axial direction L2 side with respect to the distal end portion 40a of the first tubular projecting portion 40. In the embodiment, the bearing placement space for placement of the sixth bearing 72 is formed as a space partitioned by the stepped portion 12d of the coupling radially extending portion 12 and the outer peripheral surface of the second sleeve member 95 on both sides in the radial direction R.

3. SUPPORT STRUCTURE FOR VARIOUS CONSTITUENT MEMBERS

Next, for the purpose of describing the support structure for various constituent members of the vehicle drive device 1 according to the embodiment, the support structure for the power transfer member T will be mainly described.

3-1. Support Structure in Radial Direction

As illustrated in FIGS. 2 and 3, the vehicle drive device 1 includes the first bearing 75 and the seventh bearing 77 as bearings that support the rotor member 21 in the radial direction R. The rotor member 21 is supported in the radial direction R by the first bearing 75 and the seventh bearing 77 on respective sides in the axial direction L. The first bearing 75 is a bearing that supports the rotor member 21 in the radial direction R so as to be rotatable with respect to the first support wall portion 31. A radial bearing (in the example, a ball bearing) capable of receiving a load in the radial direction R is used as the first bearing 75. The seventh bearing 77 is a bearing that supports the rotor member 21 in the radial direction R so as to be rotatable with respect to the second support wall portion 32. A radial bearing (in the example, a ball bearing) capable of receiving a load in the radial direction R is used as the first bearing 75. In the embodiment, the first bearing 75 corresponds to the "first bearing" according to the present invention.

In the embodiment, the first bearing 75 is disposed on the radially outward direction R2 side with respect to the first tubular projecting portion 40 of the first support wall portion 31. Specifically, the first bearing 75 is disposed to contact the inner peripheral surface 41b of the second tubular projecting portion 41 of the first support wall portion 31 and the outer peripheral surface 23c of the first axially projecting portion 23 of the rotor support member 22. This allows the rotor member 21 to be supported by the inner peripheral surface 41b of the second tubular projecting portion 41 via the first bearing 75. In this way, in the embodiment, the outer peripheral surface 23c of the first axially projecting portion 23 serves as a supported portion supported with respect to the first support wall portion 31 by the first bearing 75. In the example illustrated in FIG. 3, the first bearing 75 is disposed to contact a surface of the inner peripheral stepped portion 41d of the second tubular projecting portion 41 that faces the second axial direction L2 side. As illustrated in FIG. 3, the first clutch C1 is disposed at a position at which the first clutch C1 partially overlaps the first bearing 75 as seen in the axial direction L. Specifically, a portion of the clutch hub 51 on the radially outward direction R2 side and a portion of the friction member 53, which is supported by the clutch hub 51, on the radially inward direction R1 side are disposed at the same position in the radial direction R as the first bearing 75.

In the embodiment, the seventh bearing 77 is disposed on the radially inward direction R1 side with respect to the first bearing 75. Specifically, the seventh bearing 77 is disposed at a position at which the seventh bearing 77 partially overlaps the first tubular projecting portion 40 as seen in the axial direction L. More specifically, the seventh bearing 77 is disposed to contact the inner peripheral surface 32b of a portion of the second support wall portion 32 on the radially inward direction R1 side and the outer peripheral surface 28c of the thick-walled portion 28 of the plate-like member 27 attached to the rotor support member 22. This allows the rotor member 21 to be supported by the inner peripheral surface 32b of the second support wall portion 32 via the plate-like member 27 and the seventh bearing 77. In this way, the seventh bearing 77 supports the power transfer member T, which is formed from the rotor member 21, in the radial direction R so as to be rotatable with respect to the second support wall portion 32. In the example, the seventh bearing 77 is supported in the radial direction R indirectly via the plate-like member 27.

In the embodiment, the seventh bearing 77 is press-fitted (tightly fitted) with the inner peripheral surface 32b of the second support wall portion 32, and fixed to the second support wall portion 32 with the seventh bearing 77 abutting against a surface of the inner peripheral stepped portion 32d, which is formed on the inner peripheral surface 32b, that faces the first axial direction L1 side. On the other hand, the seventh bearing 77 is fitted (loosely fitted) with the outer peripheral surface 28c of the thick-walled portion 28 of the plate-like member 27 with some movement of the seventh bearing 77 allowed in the axial direction L. FIG. 3 illustrates a state in which the plate-like member 27 is slightly moved in the first axial direction L1 from a position at which the plate-like member 27 abuts against the seventh bearing 77 and a gap in the axial direction L (a third gap D3) is provided between a surface of the outer peripheral stepped portion 28d, which is formed on the outer peripheral surface 28c of the thick-walled portion 28, that faces the second axial direction L2 side and the seventh bearing 77.

In the embodiment, an eighth bearing 78 (in the example, a needle bearing) is disposed on the radially inward direction R1 side with respect to the seventh bearing 77 to support the input shaft I in the radial direction R so as to be rotatable with respect to the second support wall portion 32. The eighth bearing 78 is disposed to contact the outer peripheral surface of the input shaft I and the inner peripheral surface of the thick-walled portion 28 of the plate-like member 27. The input shaft I is supported by the inner peripheral surface 32b of the second support wall portion 32 via the thick-walled portion 28 and the seventh bearing 77 in addition to the eighth bearing 78.

The vehicle drive device 1 includes the second bearing 76 and the ninth bearing 79 (see FIG. 2) as bearings that support the coupling input member 2 in the radial direction R. The coupling input member 2 is supported in the radial direction R by the second bearing 76 and the ninth bearing 79 on respective sides in the axial direction L. As illustrated in FIG. 3, the second bearing 76 is a bearing that supports the coupling input member 2 in the radial direction R so as to be rotatable with respect to the first support wall portion 31. A radial bearing (in the example, a needle bearing) capable of receiving a load in the radial direction R is used as the second bearing 76. In the embodiment, the second bearing 76 corresponds to the "second bearing" according to the present invention.

In the embodiment, the second bearing 76 is disposed on the radially inward direction R1 side with respect to the first tubular projecting portion 40 of the first support wall portion 31. Specifically, the second bearing 76 is disposed to contact the inner peripheral surface 40b of the first tubular projecting portion 40 and the outer peripheral surface of the coupling tubular projecting portion 11. This allows the coupling input member 2 to be supported by the inner peripheral surface 40b of the first tubular projecting portion 40 via the coupling member 10 which is coupled so as to rotate together with the coupling input member 2 and which is fixed by the movement restraining mechanism MR so as to be relatively immovable in the axial direction L.

As described above, the first bearing 75 is disposed on the radially outward direction R2 side with respect to the first tubular projecting portion 40 of the first support wall portion 31, and the second bearing 76 is disposed on the radially inward direction R1 side with respect to the first tubular projecting portion 40 of the first support wall portion 31. That is, the first bearing 75 and the second bearing 76 are disposed at different positions in the radial direction R from each other. In the embodiment, the second bearing 76 is disposed at a position at which the second bearing 76 partially overlaps the first bearing 75 as seen in the radial direction R. Specifically, the second bearing 76 is slightly displaced in the second axial direction L2 with respect to the first bearing 75 such that a portion of the second bearing 76 on the first axial direction L1 side is at the same position in the axial direction L as a portion of the first bearing 75 on the second axial direction L2 side.

3-2. Support Structure in Axial Direction

As illustrated in FIGS. 2 and 3, the vehicle drive device 1 includes the fifth bearing 71 and the sixth bearing 72 as bearings that support the power transfer member T in the axial direction L with respect to the first support wall portion 31. The fifth bearing 71 is a bearing that supports the power transfer member T from the second axial direction L2 side so as to be rotatable with respect to the first support wall portion 31. A bearing (in the example, a thrust bearing) capable of receiving a load in the axial direction L is used as the fifth bearing 71. The sixth bearing 72 is a bearing that supports the power transfer member T from the first axial direction L1 side so as to be rotatable with respect to the first support wall portion 31. A bearing (in the example, a thrust bearing) capable of receiving a load in the axial direction L is used as the sixth bearing 72.

In the embodiment, the fifth bearing 71 and the sixth bearing 72 supports the coupling input member 2 and the coupling member 10 which are fixed so as to be relatively immovable in the axial direction L, among members forming the power transfer member T, with respect to the first support wall portion 31. Specifically, as illustrated in FIG. 3, the fifth bearing 71 supports the cover radially extending portion 65 from the second axial direction L2 side, and the sixth bearing 72 supports the coupling radially extending portion 12 from the first axial direction L1 side. As discussed later, each of the fifth bearing 71 and the sixth bearing 72 is configured not to prohibit relative movement of members disposed on both sides in the axial direction L in directions away from each other in the axial direction L.

As illustrated in FIG. 3, the fifth bearing 71 is disposed at a location at which the first support wall portion 31 and the cover radially extending portion 65 face each other in the axial direction L. Specifically, the fifth bearing 71 is disposed at a location at which a side surface portion of the first tubular projecting portion 40 of the first support wall portion 31 on the first axial direction L1 side and a side surface portion of the thick-walled portion 66 of the cover radially extending portion 65 on the second axial direction L2 side face each other. In the embodiment, the facing portions are positioned in a space partitioned by the stepped portion 40d of the first tubular projecting portion 40 and the stepped portion 66d of the thick-walled portion 66 on both sides in the radial direction R. The fifth bearing 71 is fitted (loosely fitted) with some movement allowed in the axial direction L with respect to at least one of a surface of the stepped portion 66d of the thick-walled portion 66 that faces the radially outward direction R2 side and a surface of the stepped portion 40d of the first tubular projecting portion 40 that faces the radially inward direction R1 side. Hence, the fifth bearing 71 does not prohibit movement of the coupling input member 2 in the first axial direction L1 with respect to the first support wall portion 31. FIG. 3 illustrates a state in which the coupling input member 2 is slightly moved in the first axial direction L1, from a state in which no gap (clearance) in the axial direction L is provided at the location at which the fifth bearing 71 is disposed, so that a gap in the axial direction L (a first gap D1) is provided between a side surface portion of the first tubular projecting portion 40 on the first axial direction L1 side and the fifth bearing 71.

As illustrated in FIG. 3, the sixth bearing 72 is disposed at a location at which the first support wall portion 31 and the coupling radially extending portion 12 face each other in the axial direction L. Specifically, the sixth bearing 72 is disposed at a location at which the distal end portion 40a of the first tubular projecting portion 40 of the first support wall portion 31 and a side surface portion of the coupling radially extending portion 12 on the first axial direction L1 side face each other. In the embodiment, the facing portions are positioned in a space partitioned by the stepped portion 12d of the coupling radially extending portion 12 and the outer peripheral surface of the second sleeve member 95 on both sides in the radial direction R. The sixth bearing 72 is fitted (loosely fitted) with some movement allowed in the axial direction L with respect to at least one of a surface of the stepped portion 12d of the coupling radially extending portion 12 that faces the radially inward direction R1 side and the outer peripheral surface of the second sleeve member 95. Hence, the sixth bearing 72 does not prohibit movement of the coupling member 10 in the second axial direction L2 with respect to the first support wall portion 31. FIG. 3 illustrates a state in which no gap in the axial direction L is provided at the location at which the sixth bearing 72 is disposed and the sixth bearing 72 contacts both the distal end portion 40a of the first tubular projecting portion 40 and a side surface portion of the coupling radially extending portion 12 on the first axial direction L1 side.

In the embodiment, further, a third bearing 73 (in the example, a thrust bearing) capable of receiving a load in the axial direction L is disposed between the coupling radially extending portion 12 and the flange portion Ia of the input shaft I in the axial direction L, and a fourth bearing 74 (in the example, a thrust bearing) capable of receiving a load in the axial direction L is disposed between the flange portion Ia of the input shaft I and the thick-walled portion 28 of the plate-like member 27 in the axial direction L. Each of the third bearing 73 and the fourth bearing 74 is also configured not to prohibit relative movement of members disposed on both sides in the axial direction L in directions away from each other in the axial direction L. FIG. 3 illustrates a state in which no gap in the axial direction L is provided at the location at which the third bearing 73 is disposed and a gap in the axial direction L (a second gap D2) is provided between the fourth bearing 74 and the thick-walled portion 28 at the location at which the fourth bearing 74 is disposed.

In the embodiment, as illustrated in FIG. 3, the fifth bearing 71 is disposed so as to partially overlap the sixth bearing 72 as seen in the axial direction L. In the embodiment, further, the fifth bearing 71 is disposed so as to partially overlap the third bearing 73, the fourth bearing 74, and the seventh bearing 77 as seen in the axial direction L. In the example, the fifth bearing 71, the sixth bearing 72, the third bearing 73, the fourth bearing 74, and the seventh bearing 77 are disposed such that there exists a position in the radial direction R included in all of a range in the radial direction R in which the fifth bearing 71 is positioned, a range in the radial direction R in which the sixth bearing 72 is positioned, a range in the radial direction R in which the third bearing 73 is positioned, a range in the radial direction R in which the fourth bearing 74 is positioned, and a range in the radial direction R in which the seventh bearing 77 is positioned.

In the case where there is a difference in rotational speed between the pump impeller 61 and the turbine runner 62 of the torque converter TC, the difference in rotational speed causes an attractive force that brings the pump impeller 61 and the turbine runner 62 closer to each other. In this event, because the turbine runner 62 is drivably coupled to the intermediate shaft M so as to be relatively movable in the axial direction L, no large load in the axial direction basically acts on the pump impeller 61. In some cases, however, movement of the turbine runner 62 in the first axial direction L1 may be hindered, and a large load in the second axial direction L2 may act on the pump impeller 61.

In the embodiment, such a load in the second axial direction L2 that may act on the pump impeller 61 is mainly received by the fifth bearing 71 which is a thrust bearing. This makes it possible to prevent a large load in the axial direction from acting on the seventh bearing 77 which is a radial bearing, which makes it possible to adopt a small bearing as the seventh bearing 77 compared to a case where a large load in the axial direction acts on the seventh bearing 77. Such a configuration is achieved by setting the total sum (hereinafter referred to as a "first total sum S1") of gaps in the axial direction L provided between the cover radially extending portion 65 and the first support wall portion 31 to be smaller than the total sum (hereinafter referred to as a "second total sum S2") of gaps in the axial direction L provided between the coupling radially extending portion 12 and the second support wall portion 32. The first total sum S1 is determined by the gaps with the cover radially extending portion 65 positioned at the extreme end of the movable range of the cover radially extending portion 65 in the axial direction L on the first axial direction L1 side. The second total sum S2 is determined by the gaps with the coupling radially extending portion 12 positioned at the extreme end of the movable range of the coupling radially extending portion 12 in the axial direction L on the first axial direction L1 side.

Specifically, in the embodiment, the rotor member 21 and the cover radially extending portion 65 (the coupling input member 2) are drivably coupled to each other so as to be relatively movable in the axial direction L. Hence, a load in the second axial direction L2 that acts on the pump impeller 61 is hardly transferred to the rotor member 21. In this case, as is clear from FIG. 3, it is necessary that the load in the axial direction should be received by at least one of the fifth bearing 71, the sixth bearing 72, the third bearing 73, the fourth bearing 74, and the seventh bearing 77. That is, in the embodiment, the gaps that contribute to the first total sum S1 include only a gap in the axial direction L at the location at which the fifth bearing 71 is disposed. Meanwhile, the gaps that contribute to the second total sum S2 include a gap in the axial direction L at the location at which the sixth bearing 72 is disposed, a gap in the axial direction L at the location at which the third bearing 73 is disposed, a gap in the axial direction L at the location at which the fourth bearing 74 is disposed, and a gap in the axial direction L at the location at which the seventh bearing 77 is disposed. Such gaps at the location at which each bearing is disposed also include a gap provided inside the bearing that allows relative movement in the axial direction L between members forming the bearing.

A specific description is made on the basis of FIG. 3. FIG. 3 illustrates a situation where the coupling input member 2 and the coupling member 10, which are coupled to each other so as to be relatively immovable in the axial direction L, are positioned at the extreme end of the movable range in the axial direction L on the first axial direction L1 side. Therefore, no gap in the axial direction L is provided at the location at which the sixth bearing 72 is disposed, and a gap in the axial direction L (the first gap D1) is provided at the location at which the fifth bearing 71 is disposed. In this case, the first total sum S1 is "D1". Meanwhile, FIG. 3 illustrates a state in which no gap in the axial direction L is provided at the location at which the third bearing 73 is disposed, a gap in the axial direction L (the second gap D2) is provided at the location at which the sixth bearing 72 is disposed, and a gap in the axial direction L (the third gap D3) is provided at the location at which the seventh bearing 77 is disposed. In this case, the second total sum S2 is "D2+D3".

In the embodiment, the first total sum S1 is set to be smaller than the second total sum S2 (D1<D2+D3). Hence, even in the case where a large load in the second axial direction L2 acts on the pump impeller 61, the gap in the axial direction L provided between the cover radially extending portion 65 and the first support wall portion 31 disappears before the gap in the axial direction L provided between the coupling radially extending portion 12 and the second support wall portion 32 disappears. Therefore, such a load can be received by the fifth bearing 71 to prevent a large load in the axial direction from acting on the seventh bearing 77.

In the embodiment, further, in order to prevent a large load in the second axial direction L2 that acts on the pump impeller 61 from acting on not only the seventh bearing 77 but also the snap ring 93 retained on the rotor holding portion 25, the following configuration is adopted. That is, the first total sum S1 is set to be smaller than the gap in the axial direction L (the fourth gap D4) between the plate-like member 27 and the snap ring 93 in the case illustrated in FIG. 3. In FIG. 3, the rotor member 21 is disposed to contact the first bearing 75, and the plate-like member 27 is positioned at the extreme end of the movable range of the plate-like member 27 in the axial direction L on the first axial direction L1 side (at a position at which the plate-like member 27 abuts against the inner peripheral stepped portion 25d). In such a case, it is possible to further prevent a load in the axial direction L from acting on the snap ring 93 by designing various components such that the relationship "D4>D2+D3" is met.

4. OTHER EMBODIMENTS

Lastly, vehicle drive devices according to other embodiments of the present invention will be described. A configuration disclosed in each of the following embodiments may be applied in combination with a configuration disclosed in any other embodiment unless any contradiction occurs.

(1) In the embodiment described above, the rotor member 21 and the coupling radially extending portion 12 (the coupling input member 2) are drivably coupled to each other so as to be relatively movable in the axial direction L. However, the present invention is not limited thereto. The rotor member 21 and the coupling input member 2 may be drivably coupled to each other so as to be relatively immovable in the axial direction L by coupling the coupling member 10 and the rotor support member 22 so as to be relatively immovable in the axial direction L. In this case, the coupling member 10 may not be separate from (a separate member that is independent of) the rotor support member 22 and may be formed integrally with the rotor support member 22. In this case, the second total sum S2 in the example illustrated in FIG. 3 is "D3", and the various portions are preferably designed such that the relationship "D1<D3" is met.

(2) In the embodiment described above, the coupling member 10 includes the coupling radially extending portion 12 which extends to a location on the radially outward direction R2 side with respect to the first tubular projecting portion 40, and the engagement portions of the coupling member 10 and the rotor support member 22 are positioned on the radially outward direction R2 side with respect to the first tubular projecting portion 40. However, the present invention is not limited thereto. The rotor support member 22 may include a portion that extends to a location on the radially inward direction R1 side with respect to the first tubular projecting portion 40, and the engagement portions of the coupling member 10 and the rotor support member 22 may be positioned on the radially inward direction R1 side with respect to the first tubular projecting portion 40. In this case, the coupling member 10 may include only the coupling tubular projecting portion 11.

(3) In the embodiment described above, the coupling member 10 is separate from the coupling input member 2. However, the present invention is not limited thereto. The coupling member 10 may be formed integrally with the coupling input member 2.

(4) In the embodiment described above, the inner peripheral stepped portion 11d is formed on the inner peripheral surface of the coupling tubular projecting portion 11, and a surface of the fastening member 90, which is fastened to the cover tubular projecting portion 64, that faces the first axial direction L1 side abuts against a surface of the inner peripheral stepped portion 11d that faces the second axial direction L2 side, thereby forming the movement restraining mechanism MR. However, the present invention is not limited thereto. The coupling tubular projecting portion 11 may not include the inner peripheral stepped portion 11d, and a surface of the fastening member 90 that faces the first axial direction L1 side may abut against a surface of a base end portion of the coupling tubular projecting portion 11 on the second axial direction L2 side that faces the second axial direction L2 side. The movement restraining mechanism MR may be a mechanism that restrains relative movement in the axial direction L between the cover tubular projecting portion 64 and the coupling tubular projecting portion 11 using a snap ring or the like.

(5) In the embodiment described above, the cover portion 63 and the coupling member 10 are coupled to each other through spline fitting with the inner peripheral surface of the coupling tubular projecting portion 11 externally fitted with the outer peripheral surface of the cover tubular projecting portion 64. However, the present invention is not limited thereto. The cover tubular projecting portion 64 may include spline teeth on its inner peripheral surface, the coupling tubular projecting portion 11 may include spline teeth on its outer peripheral surface, and the cover portion 63 and the coupling member 10 may be coupled to each other through spline fitting with the inner peripheral surface of the cover tubular projecting portion 64 externally fitted with the outer peripheral surface of the coupling tubular projecting portion 11.

(6) In the embodiment described above, the first bearing 75 is disposed on the radially outward direction R2 side with respect to the first tubular projecting portion 40, and the second bearing 76 is disposed on the radially inward direction R1 side with respect to the first tubular projecting portion 40. However, the present invention is not limited thereto. The first bearing 75 and the second bearing 76 may be disposed on the same side in the radial direction R as each other with respect to the first tubular projecting portion 40.

(7) In the embodiment described above, the first clutch C1 is disposed at a position at which the first clutch C1 partially overlaps the first bearing 75 as seen in the axial direction L. However, the present invention is not limited thereto. For example, the first clutch C1 may be disposed at a different position in the radial direction R from the first bearing 75 (for example, on the radially inward direction R1 side with respect to the first bearing 75) so as not to partially overlap the first bearing 75 as seen in the axial direction L.

(8) In the embodiment described above, the first clutch C1 is disposed on the radially inward direction R1 side with respect to the rotor RO and at a position at which the first clutch C1 partially overlaps the rotor Ro as seen in the radial direction R. However, the present invention is not limited thereto. The first clutch C1 may be disposed on the first axial direction L1 side or on the second axial direction L2 side with respect to the rotor Ro so as not to partially overlap the rotor Ro as seen in the radial direction R. Alternatively, the first clutch C1 may be disposed on the radially outward direction R2 side with respect to the first clutch C1.

(9) In the embodiment described above, the second bearing 76 is disposed at a position at which the second bearing 76 partially overlaps the first bearing 75 as seen in the radial direction R. However, the second bearing 76 may be disposed at a different position in the axial direction L from the first bearing 75 so as not to partially overlap the first bearing 75 as seen in the radial direction R.

(10) In the embodiment described above, an end portion of the coupling radially extending portion 12 on the radially outward direction R2 side is formed as an externally toothed engagement portion in which a plurality of engagement pieces that project to the radially outward direction R2 side are distributed in the circumferential direction, and the distal end portion 24a of the second axially projecting portion 24 is formed as a cylindrical engagement portion in which a plurality of (the same number as the engagement pieces) through holes that extend in the radial direction R and that have such a width in the circumferential direction and a length in the axial direction L that enable insertion of the engagement pieces are distributed in the circumferential direction. However, the present invention is not limited thereto. For example, the distal end portion 24a of the second axially projecting portion 24 may be formed as an internally toothed engagement portion in which a plurality of engagement pieces that project to the radially inward direction R1 side are distributed in the circumferential direction in place of the through holes. In such a configuration, unlike the embodiment described above, the second axially projecting portion 24 has an annular body portion, also at the distal end portion 24a, that extends continuously over the entire circumference.

(11) In the embodiment described above, the outer peripheral surface 23c of the first axially projecting portion 23 of the rotor support member 22 serves as a supported portion supported with respect to the first support wall portion 31 by the first bearing 75. However, the present invention is not limited thereto. The first bearing 75 may be disposed so as to contact the inner peripheral surface 23b of the first axially projecting portion 23 and the outer peripheral surface of the first support wall portion 31 (for example, the outer peripheral surface of the first tubular projecting portion 40). That is, the inner peripheral surface 23b of the first axially projecting portion 23 may be a supported portion supported with respect to the first support wall portion 31 by the first bearing 75. A portion of the rotor support member 22 other than the first axially projecting portion 23 (such as the inner peripheral surface of the second axially projecting portion 24, for example) may be a supported portion supported with respect to the first support wall portion 31 by a bearing. In this case, the rotor support member 22 may not include the first axially projecting portion 23.

(12) In the embodiment described above, the first axially projecting portion 23 of the rotor support member 22 is formed at an end portion of the radially extending portion 26 on the radially inward direction R1 side. However, the present invention is not limited thereto. The first axially projecting portion 23 may be formed at an intermediate portion of the radially extending portion 26 in the radial direction R (for example, on the radially outward direction R2 side with respect to the second tubular projecting portion 41).

(13) In the embodiment described above, the fifth bearing 71 and the sixth bearing 72 support the power transfer member T with respect to the first tubular projecting portion 40 of the first support wall portion 31. However, the present invention is not limited thereto. At least one of the fifth bearing 71 and the sixth bearing 72 may support the power transfer member T with respect to a portion of the first support wall portion 31 with a uniform thickness in the axial direction L. In such a configuration, the first support wall portion 31 may not include the first tubular projecting portion 40.

(14) In the embodiment described above, the vehicle drive device 1 has a single-axis configuration. However, the present invention is not limited thereto. The vehicle drive device 1 may also be a drive device of a multi-axis configuration including a counter gear mechanism or the like, for example. Such a configuration is suitably mounted on FF (Front-Engine Front-Drive) vehicles.

(15) In the embodiment described above, the vehicle drive device 1 includes the input shaft I drivably coupled to the internal combustion engine E, and the first clutch C1. However, the present invention is not limited thereto. The vehicle drive device 1 may not include the input shaft I or the first clutch D1.

(16) Also regarding other configurations, the embodiment disclosed herein is illustrative in all respects, and the present invention is not limited thereto. That is, a configuration not described in the claims of the present invention may be altered without departing from the object of the present invention.

The present invention may be suitably applied to a vehicle drive device including a rotary electric machine, a fluid coupling disposed coaxially with the rotary electric machine, and a case that houses the rotary electric machine and the fluid coupling, the fluid coupling including a coupling input member drivably coupled to a rotor member of the rotary electric machine and a coupling output member drivably coupled to wheels.

The invention claimed is:

1. A vehicle drive device comprising a rotary electric machine, a fluid coupling disposed coaxially with the rotary electric machine on a first axial direction side with respect to the rotary electric machine, and a case that houses the rotary electric machine and the fluid coupling, the first axial direction side being one side in an axial direction with respect to the rotary electric machine, and the fluid coupling including a coupling input member drivably coupled to a rotor member of the rotary electric machine and a coupling output member drivably coupled to wheels, wherein:

the case includes a support wall portion that extends in a radial direction of the rotary electric machine at a location between the rotary electric machine and the fluid coupling in the axial direction; and a first bearing and a second bearing that is separate from the first bearing are disposed at different positions in the radial direction from each other, the first bearing being configured to support the rotor member in the radial direction so as to be rotatable with respect to the support wall portion, and the second bearing being configured to support the coupling input member in the radial direction so as to be rotatable with respect to the support wall portion.

2. The vehicle drive device according to claim 1, wherein:
the support wall portion includes a tubular projecting portion that projects to a second axial direction side that is an opposite side from the first axial direction side; and
the first bearing is disposed on an outer side in the radial direction with respect to the tubular projecting portion, and the second bearing is disposed on an inner side in the radial direction with respect to the tubular projecting portion.

3. The vehicle drive device according to claim 2, further comprising:
an input member drivably coupled to an internal combustion engine; and
an engagement device provided in a power transfer path between the input member and the rotor member and capable of varying a state of engagement, wherein
the engagement device is disposed at a position at which the engagement device partially overlaps the first bearing as seen in the axial direction.

4. The vehicle drive device according to claim 3, wherein:
the rotor member includes a rotor body and a rotor support member that extends inward in the radial direction from the rotor body to support the rotor body; and
the engagement device is disposed on an inner side in the radial direction with respect to the rotor body and at a position at which the engagement device partially overlaps the rotor body as seen in the radial direction.

5. The vehicle drive device according to claim 3, wherein the second bearing is disposed at a position at which the second bearing partially overlaps the first bearing as seen in the radial direction.

6. The vehicle drive device according to claim 3, wherein:
the rotor member includes a rotor body and a rotor support member that extends inward in the radial direction from the rotor body to support the rotor body;
the rotor support member includes an axially projecting portion that is a tubular projecting portion that projects to the first axial direction side; and
an outer peripheral surface or an inner peripheral surface of the axially projecting portion serves as a supported portion supported with respect to the support wall portion by the first bearing.

7. The vehicle drive device according to claim 2, wherein the second bearing is disposed at a position at which the second bearing partially overlaps the first bearing as seen in the radial direction.

8. The vehicle drive device according to claim 2, wherein:
the rotor member includes a rotor body and a rotor support member that extends inward in the radial direction from the rotor body to support the rotor body;

the rotor support member includes an axially projecting portion that is a tubular projecting portion that projects to the first axial direction side; and an outer peripheral surface or an inner peripheral surface of the axially projecting portion serves as a supported portion supported with respect to the support wall portion by the first bearing.

9. The vehicle drive device according to claim 2, wherein the rotor member and the coupling input member are drivably coupled to each other so as to be relatively movable in the axial direction.

10. The vehicle drive device according to claim 2, wherein:
the support wall portion includes a tubular projecting portion that projects to the second axial direction side that is an opposite side from the first axial direction side;
the tubular projecting portion is disposed on an inner side in the radial direction with respect to the rotor member and at a position at which the tubular projecting portion partially overlaps the rotor member as seen in the radial direction;
the vehicle drive device further includes a coupling portion that extends in the axial direction through a location on a radially inner side with respect to the tubular projecting portion and that extends on the second axial direction side with respect to a distal end portion of the tubular projecting portion to a location on an outer side in the radial direction with respect to the tubular projecting portion; and
the rotor member and the coupling input member are coupled to each other via the coupling portion.

11. The vehicle drive device according to claim 1, further comprising:
an input member drivably coupled to an internal combustion engine; and
an engagement device provided in a power transfer path between the input member and the rotor member and capable of varying a state of engagement, wherein
the engagement device is disposed at a position at which the engagement device partially overlaps the first bearing as seen in the axial direction.

12. The vehicle drive device according to claim 11, wherein:
the rotor member includes a rotor body and a rotor support member that extends inward in the radial direction from the rotor body to support the rotor body; and
the engagement device is disposed on an inner side in the radial direction with respect to the rotor body and at a position at which the engagement device partially overlaps the rotor body as seen in the radial direction.

13. The vehicle drive device according to claim 11, wherein
the second bearing is disposed at a position at which the second bearing partially overlaps the first bearing as seen in the radial direction.

14. The vehicle drive device according to claim 11, wherein:
the rotor member includes a rotor body and a rotor support member that extends inward in the radial direction from the rotor body to support the rotor body;
the rotor support member includes an axially projecting portion that is a tubular projecting portion that projects to the first axial direction side; and
an outer peripheral surface or an inner peripheral surface of the axially projecting portion serves as a supported portion supported with respect to the support wall portion by the first bearing.

15. The vehicle drive device according to claim 11, wherein
the rotor member and the coupling input member are drivably coupled to each other so as to be relatively movable in the axial direction.

16. The vehicle drive device according to claim 11, wherein:
the support wall portion includes a tubular projecting portion that projects to a second axial direction side that is an opposite side from the first axial direction side;
the tubular projecting portion is disposed on an inner side in the radial direction with respect to the rotor member and at a position at which the tubular projecting portion partially overlaps the rotor member as seen in the radial direction;
the vehicle drive device further includes a coupling portion that extends in the axial direction through a location on a radially inner side with respect to the tubular projecting portion and that extends on the second axial direction side with respect to a distal end portion of the tubular projecting portion to a location on an outer side in the radial direction with respect to the tubular projecting portion; and
the rotor member and the coupling input member are coupled to each other via the coupling portion.

17. The vehicle drive device according to claim 1, wherein
the second bearing is disposed at a position at which the second bearing partially overlaps the first bearing as seen in the radial direction.

18. The vehicle drive device according to claim 1, wherein:
the rotor member includes a rotor body and a rotor support member that extends inward in the radial direction from the rotor body to support the rotor body;
the rotor support member includes an axially projecting portion that is a tubular projecting portion that projects to the first axial direction side; and
an outer peripheral surface or an inner peripheral surface of the axially projecting portion serves as a supported portion supported with respect to the support wall portion by the first bearing.

19. The vehicle drive device according to claim 1, wherein
the rotor member and the coupling input member are drivably coupled to each other so as to be relatively movable in the axial direction.

20. The vehicle drive device according to claim 1, wherein:
the support wall portion includes a tubular projecting portion that projects to a second axial direction side that is an opposite side from the first axial direction side;
the tubular projecting portion is disposed on an inner side in the radial direction with respect to the rotor member and at a position at which the tubular projecting portion partially overlaps the rotor member as seen in the radial direction;
the vehicle drive device further includes a coupling portion that extends in the axial direction through a location on a radially inner side with respect to the tubular projecting portion and that extends on the second axial direction side with respect to a distal end portion of the tubular projecting portion to a location on an outer side in the radial direction with respect to the tubular projecting portion; and
the rotor member and the coupling input member are coupled to each other via the coupling portion.

* * * * *